United States Patent [19]
Ramaswamy

[11] 3,811,912
[45] May 21, 1974

[54] METHOD OF MAKING EPITAXIAL FILM OPTICAL DEVICES

[75] Inventor: Vellayan Ramaswamy, Lincroft, N.J.

[73] Assignee: Bell Telephone Laboratories, Incorporated, Murray Hill, N.J.

[22] Filed: Dec. 21, 1972

[21] Appl. No.: 317,276

[52] U.S. Cl............... 117/33.3, 117/113, 117/169, 252/300, 350/96 WG
[51] Int. Cl..... B29d 11/00, B44d 5/06, C03c 17/00
[58] Field of Search.... 252/300; 117/33.3, 113/169; 340/96 WG

[56] References Cited
UNITED STATES PATENTS
3,695,910 10/1972 Lauderbach et al............... 117/33.3
3,695,908 10/1972 Szupillo............................. 117/33.3
3,341,419 9/1967 Eretmann et al.................. 252/62.1

Primary Examiner—Ronald H. Smith
Assistant Examiner—J. P. Brammer
Attorney, Agent, or Firm—G. S. Indig

[57] ABSTRACT

Thin film optical circuit devices, such as wave guides, electrooptic devices, etc., are prepared on $KH_2PO_4$ (KDP) substrates by epitaxial growth of single crystals having the compostion $(NH_4)_x K_{1-x} H_2PO_4$, where x varies from about 0.05 to about 0.2. Such films, which have low losses, are matchable to many glassy transmission media. The difference in refractive index between substrate and epitaxial film may be controlled by varying the composition of the epitaxial film.

7 Claims, 2 Drawing Figures

METHOD OF MAKING EPITAXIAL FILM OPTICAL DEVICES

BACKGROUND OF THE INVENTION

1. Field of the Invention

The present invention is concerned with thin-film optical circuit devices. More particularly, the invention is concerned with thin-film optical wave guides and associated optical devices utilizing epitaxially grown crystal films of ammonium dihydrogen phosphate (ADP, $NH_4H_2PO_4$) and potassium dihydrogen phosphate (KDP, $KH_2PO_4$) in various proportions.

2. Description of the Prior Art

In proposed optical communication systems, it is desirable to have integrated optical circuit devices which function to guide and manipulate information-carrying light waves. This has led to much research on various thin-film optical wave guides and associated optical devices analogous to the wave guides or coaxial cables and associated devices of the lower frequency systems. The initial work in integrated optics has revealed that the eventual success of the proposed optical systems depends largely upon the development of thin-film materials which have suitable optical transmission properties and which are suitable for the construction of devices involving the manipulation of the optically guided waves. For a general description of integrated optics and of many of the forms that the optical circuit devices may take, see, e.g., Vol. 48, Bell System Technical Journal, pp. 2059–2069 (1969).

Early efforts by workers in the art toward developing suitable optical materials have involved the use of various crystalline and non-crystalline materials for thin films, including zinc oxide, zinc sulfide, and glass films. Experiments have shown, however, that due to the polycrystalline structure of the materials, thin films of zinc oxide and zinc sulfide have high scattering losses for optically guided waves. Subsequent experiments on single-crystal films of materials such as gallium arsenide have shown some improvement in scattering losses. However, the waveguiding losses in such films are still high, mainly due to free carrier absorption. In addition, the large refractive index of gallium arsenide and related materials ($n > 3.0$) has made the application of such films to typical optical systems, such as glass ($n \approx 1.5$), quite difficult.

Accordingly, effort in the art has continued toward the development of low loss optical materials suitable for the proposed thin-film devices.

Early efforts by workers in the art also have disclosed the use of ADP and KDP in optical systems. ADP and KDP are desirable materials because of their low losses and transparent optical properties. However, attempts to fabricate thin film devices using these materials are apparently not known.

SUMMARY OF THE INVENTION

In accordance with the invention, a method of fabricating optical circuit devices is disclosed. The devices consist of a thin crystalline film of ADP-KDP, epitaxially grown on a KDP substrate from an aqueous solution of ADP and KDP. The crystalline film has the general composition $(NH_4)_xK_{1-x}H_2PO_4$, in which $x$ varies from about 0.05 to about 0.2.

DETAILED DESCRIPTION OF THE ILLUSTRATIVE EMBODIMENTS

1. The Device

Figure 1:
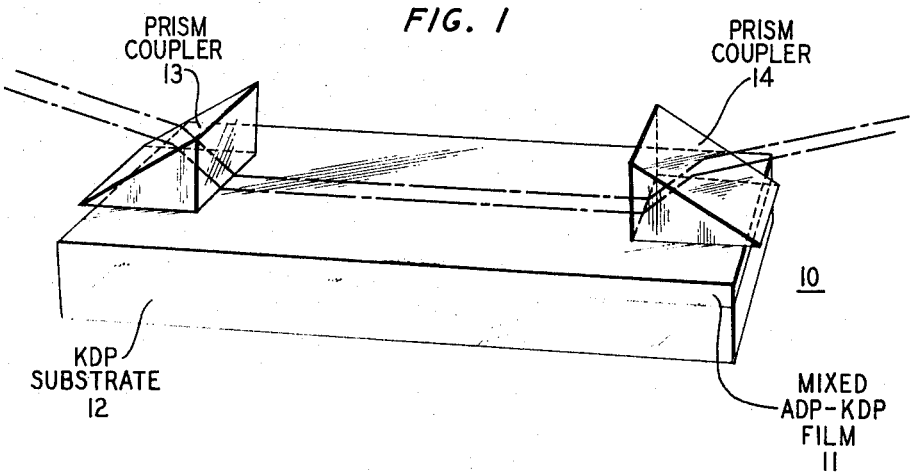
FIG. 1 is a perspective view of an embodiment of the invention.

In FIG. 1, a thin-film optical device 10, here a wave guide, is shown. In accordance with the invention, the device comprises a film 11 of an optically transparent single crystalline material, which consists essentially of $(NH_4)_xK_{1-x}H_2PO_4$, where x varies from about 0.05 to about 0.2. The film is epitaxially grown on substrate 12, also an optically transparent single crystalline material, which consists essentially of $KH_2PO_4$. The substrate has a lower index of refraction than that of the film, due to the fact that the index of refraction of KDP is lower than that of ADP. For the purposes of the invention, the thickness of the film may be anywhere within the range of 0.1 to 100 times the wavelength but is preferably between one and 10 times the wavelength. It is contemplated that the wavelengths to be propagated in the film will lie in the visible and near-visible region, that is, in the region from 0.1 micrometers ($10^{-7}$ meters) to 10 micrometers. Thus, the thickness of the film may range from 0.01 micrometers to 1,000 micrometers, with a thickness range of from 0.1 micrometers to 100 micrometers being preferred. The radiation is thus effectively confined in that dimension by the dielectric discontinuities provided by the major surfaces of the film, i.e., the substrate/film and airspace/film interfaces. Propagation of the radiation in the two broad dimensions of the film is typically unrestricted.

Prism coupling means 13 and 14 are provided for introducing and extracting radiation in the film. The radiation is typically coherent, with the wavelength in the optical range (which includes visible and near-visible wavelengths), and may be provided by any suitable source, such as a laser (not shown). Utilization apparatus (not shown) is typically positioned to receive the extracted radiation. Also, polarizing means (not shown) can be provided for polarizing the incoming or outgoing radiation in embodiments in which polarized waves are utilized. For films at least a few micrometers in thickness, introduction of optical energy is possible using direct coupling means without the need for the prism coupling means.

The particular coupling prisms 13 and 14, as depicted, are described in detail in Vol. 14, Applied Physics Letters, page 291 (1969). Other means are also available for performing the same function. Optical coupling and decoupling can be accomplished, for example, by means of an optical grating formed directly on the surface of the guiding film so as to be structurally integral therewith or by direct coupling if the film is fairly thick, i.e., at least a few micrometers; see, e.g., Vol. 49, Bell System Technical Journal, pp. 1602–1608 (1970) and Vol. 50, Bell System Technical Journal, pp. 43–57 (1971).

Means (not shown) may also be employed for modifying the radiation. For example, electrodes may be deposited on the surface of the device for modulating the radiation or for converting TE to TM modes and vice versa, etc. Hybrid couplers and frequency-selective filters, as formed by photolithographic techniques, are also known. Such devices are described in Vol. 48, Bell System Technical Journal, pp. 2059–2069 (1969).

2. Crystal Growth

Figure 2:
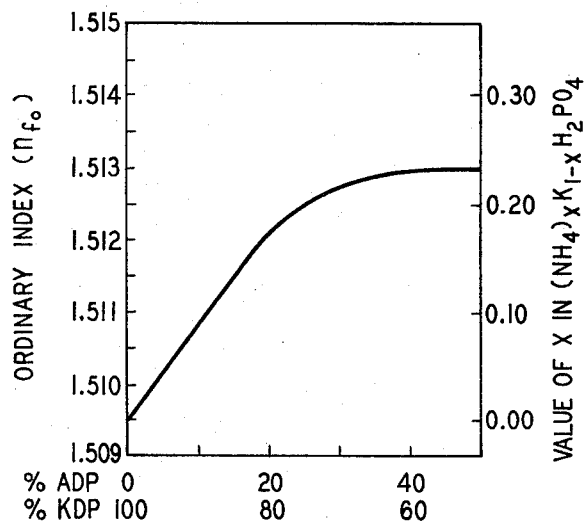
FIG. 2 is a plot, on coordinates of index of refraction and composition, of the dependence of the index of refraction of the ADP-KDP film on the composition of the solution from which the films are grown.

The mixed ADP-KDP films are grown in aqueous solutions of ADP and KDP containing up to 50 weight percent ADP in composition. The dependence of film composition on solution composition is depicted in FIG. 2, which shows that for a solution of composition up to about 20 weight percent ADP in solution, the film composition is a linear function of the solution composition. From about 20 weight percent ADP in solution to 50 weight percent ADP in solution, there is little change in the film composition $x$, which remains approximately constant at about 0.2. Above 50 weight percent ADP in solution, the KDP substrate evidences dissolution.

It is considered easier to grow the mixed ADP-KDP films at higher pH values; under such conditions, a faster growth rate is observed. Unmodified aqueous solutions of ADP-KDP as prepared, however, have a comparatively low pH. For example, a 50—50 ADP-KDP solution has a pH of 3.6, while a 40–60 ADP-KDP solution has a pH of 3.8. On the other hand, increasing the pH by adding potassium hydroxide (KOH), while resulting in an increase in the growth rate, also decreases the relative amount of ADP in solution. Yet high ADP-containing compositions are desirable for matching the refractive index of the films to that of glassy transmission media. Thus, a compromise in solution composition and pH must be made. Accordingly, the higher ADP-containing solutions, from about 20 weight percent to 50 weight percent ADP, are preferred, at some sacrifice in growth rate. Lower film compositions than $x = 0.2$, if desired, may be fabricated by increasing the pH to a maximum value of 6.1.

Alternatively, the pH for compositions below 50 weight percent ADP can be increased by adding ammonium hydroxide ($NH_4OH$) without reducing either the growth rate or the film composition. However, the final $NH_4^+/K^+$ ratio of the solution should not exceed the value of 1, in order to avoid realizing more than 50 weight percent ADP in solution.

It has been found that a desirable pH range of the mixed ADP-KDP solutions is from 3.6 to 6.1. Below a value of 3.6, which can be achieved, for example, by addition of phosphoric acid ($H_3PO_4$), films of non-uniform thickness result. Above a value of 6.1, the growth of pure KDP is increasingly favored. Such a value results in films having a value of $x$ of less than about 0.05, which is considered to be the preferred lower limit for $x$. For solutions containing from 20 weight percent to 50 weight percent ADP, a pH range of 5.0 to 5.8 is preferred. Such a range results in a reasonably fast growth rate together with a reasonably high refractive index.

Films ranging from 5 micrometers to 75 micrometers in thickness have been grown on a KDP substrate, for example, by conventional solvent evaporation techniques from saturated solutions containing varying compositions of ADP and KDP by weight.

The substrate is prepared by well-known polishing techniques, as described, for example, in Volume 43, Review of Scientific Instruments, September 1972, pp. 1294–1296. The substrate is then etched to remove damage caused by polishing by one of the following methods: (a) immersion of the substrate in a solution of 20 percent ethanol and 80 percent water, or (b) lapping the surface on a polishing cloth saturated with a solution of 20 percent ethanol and 80 percent water. The substrate is then suspended in the solution from a glass rod rotating at a low rate, with a directional change every few minutes. The crystal growth apparatus is similar to that shown in Growing Crystals with a Rotary Crystallizer, by A. N. Holden and R. H. Thompson.

The rate of rotation is carried out in the range of five revolutions per minute to 30 revolutions per minute, with a preferred rotation rate of 10 revolutions per minute. Higher rotational rates tend to result in a decreased rate of film growth, while lower rotational rates tend to adversely affect the uniformity of growth rate. The direction may be reversed every 1 minute to 5 minutes, with a preferred directional change of every 2 minutes. Longer times between reversal result in uneven thickness variations across the surface of the film, while shorter times between reversal result in non-uniform growth rates.

In using solvent evaporation techniques, it has been found that the temperature of the solution, which is conveniently maintained by an oil bath, may range to a maximum of 35° C. Films grown at higher temperatures tend to fracture on being cooled to room temperature due to thermal stresses. It has also been found difficult to stabilize the temperature when operating at room temperature; thus a range of 30° C to 35° C is preferred for crystal growth. Films prepared under such conditions typically grow at the rate in the range of about 1 micrometer per hour to 5 micrometers per hour, depending on the pH. When film growth is completed, the substrate is removed from the solution and placed in a bath of methyl alcohol at the same temperature at which crystal growth occurred. The alcohol bath is then allowed to cool to room temperature in order to relieve thermal stresses in the film during cooling. A cooling rate of about 5° per hour to 10° per hour is convenient.

While solvent evaporation as described above is a convenient technique for growing these films, the growth conditions of the films are nevertheless affected by such external conditions as humidity, air movement, and the like.

As an alternative to the solvent evaporation technique, crystal growth may be performed in an enclosed environment by lowering the temperature from an initial temperature in the range of about 30° to 35° C, using saturated solutions. As the temperature is lowered, typically about 1° C per day, the solution begins to supersaturate, with consequent film growth. The temperture is gradually reduced to room temperature at the same rate, and thermal stresses are thereby reduced.

3. Example

An epitaxial film of $(NH_4)_x K_{1-x} H_2 PO_4$, 38 micrometers in thickness, was grown at 31° C on a substrate consisting essentially of KDP from a saturated aqueous solution consisting essentially of 40 percent ADP and 60 percent KDP by weight. The pH was adjusted to a value of 5.68 by the addition of an aqueous solution of KOH. X-ray diffraction patterns taken of the film indicated a single crystal film, with an orientation corresponding to that of (100).

To demonstrate optical guidance in a typical epitaxial film of $(NH_4)_x K_{1-x} H_2PO_4$ on KDP substrates, the film was excited using a He—Ne laser operated in the fundamental transverse electromagnetic mode ($TEM_{oo}$). The output face of the crystal was imaged on a ground glass screen. A measurement of the transmitted intensity confirmed waveguiding in the epitaxial film. The ordinary ($n_{fo}$) and extraordinary ($n_{fe}$) refractive index values of the film, measured at 589.3 nanometers, were 1.5105 and 1.4695, respectively. The values corresponded to a value of $x$ of 0.07 in the $(NH_4)_x K_{1-x} H_2PO_4$ mixed crystal film.

4. Conclusion

Films grown having the (100) orientation typically exhibit low losses (e.g., about 0.2 db/cm and less). While films of excellent quality having that orientation have been grown, it is also possible to grow good quality films having both the (001) and the (101) orientations. The (101) orientation is of importance, for example, since such films are suitable for waveguide phase modulator applications.

A mixed ADP-KDP film prepared in accordance with the invention has, like both end members, a tetragonal crystal structure and evidences electrooptic properties. The mixed ADP-KDP films, having any of the orientations of (001), (100) and (101), can be utilized in a variety of devices, such as waveguides, modulators, mode converters, and electrooptic switches. Deposition of electrodes in patterns well-known in the art determine the device.

What is claimed is:

1. A method for fabricating a thin-film optical device in which a first optically transparent single crystalline material is grown on a substrate consisting essentially of a second optically transparent single crystalline material to form a film, said film having a higher index of refraction than that of said substrate, characterized in that said epitaxial film consisting essentially of $(NH_4)_x K_{1-x} H_2PO_4$, in which $x$ ranges from about 0.05 to about 0.2 is epitaxially grown onto said substrate consisting essentially of $KH_2PO_4$ from a saturated aqueous solution consisting essentially of from 5 weight percent to 50 weight percent $NH_4H_2PO_4$ and the balance $KH_2PO_4$.

2. The method of claim 1 in which said saturated aqueous solution consists essentially of from 20 to 50 weight percent $NH_4H_2PO_4$ and the balance $KH_2PO_4$.

3. The method of claim 2 in which said saturated aqueous solution has a pH ranging from 3.6 to 6.1.

4. The method of claim 3 in which said pH of said saturated aqueous solution ranges from 5.0 to 5.8.

5. The method of claim 1 in which crystal growth of said film is achieved
   a. by suspending said substrate in said saturated aqueous solution, said saturated aqueous solution being exposed to the external environment in order to effect evaporation of said saturated aqueous solution, which is maintained at a temperature of from 30° to 35° C, and
   b. by rotating said substrate at a rate of from five revolutions per minute to 30 revolutions per minute with a reversal in rotation every 1 to 5 minutes.

6. The method of claim 1 in which crystal growth of said film is achieved
   a. by suspending said substrate in said saturated aqueous solution, said saturated aqueous solution being isolated from the external environment and being initially maintained at a temperature of from 30° to 35° C,
   b. by rotating said substrate at a rate of from five revolutions per minute to 30 revolutions per minute with a reversal in rotation every 1 to 5 minutes, and
   c. by reducing the temperature at a rate of about 1° C per day.

7. The method of claim 1 in which said film is grown to a thickness of from about 5 micrometers to 75 micrometers.

* * * * *